April 18, 1939. P. W. PARKERTON 2,154,526
MATED COUPLING FOR FLUID SYSTEMS
Filed June 15, 1938 2 Sheets-Sheet 1
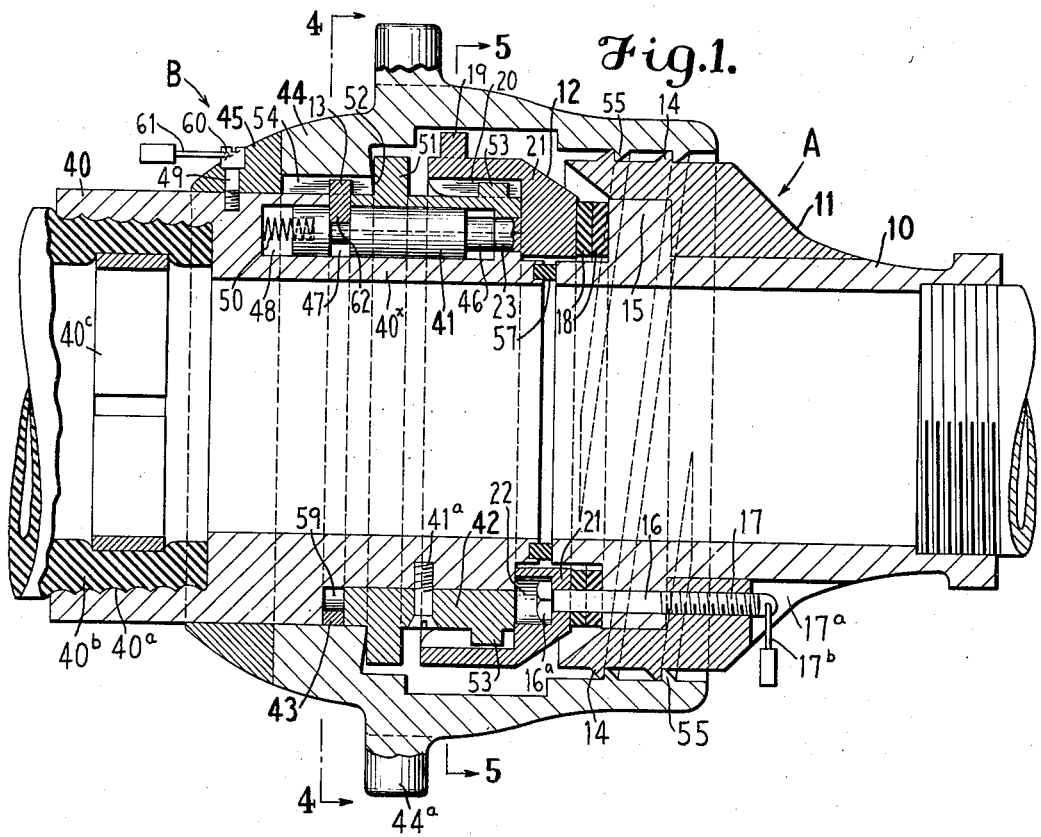
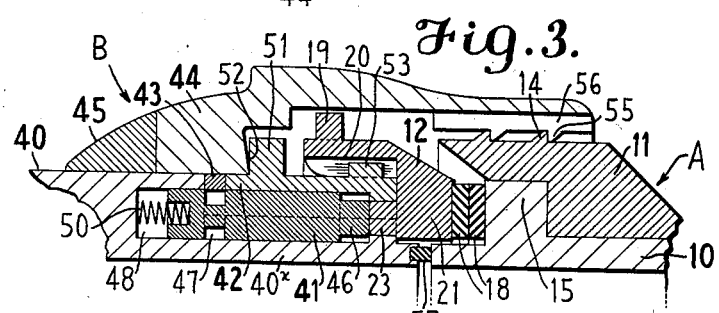
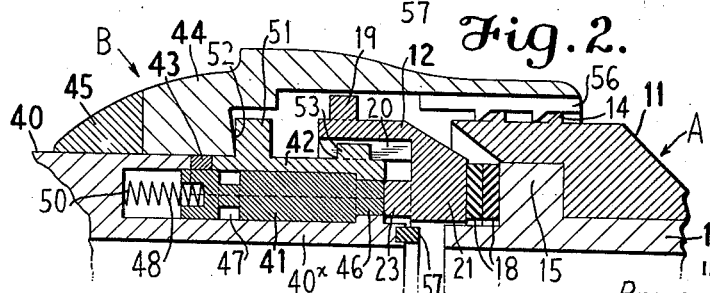
INVENTOR
Prosper W. Parkerton
BY
Charles Holland
ATTORNEY INVENTOR
Prosper W. Parkerton
BY
Charles J. Holland
ATTORNEY Patented Apr. 18, 1939

2,154,526

UNITED STATES PATENT OFFICE 2,154,526

MATED COUPLING FOR FLUID SYSTEMS

Prosper W. Parkerton, West Hartford, Conn.

Application June 15, 1938, Serial No. 213,797

6 Claims. (Cl. 285—71)

The present invention relates to quick locking mated couplings for fluid systems. The coupling members of the invention are designed to unite separate units, as a flexible hose from a tank truck with a stationary tank or reservoir, and are adapted by the arrangement of their respective parts in relation to each other and by the specific combination of such parts, to form a joint that is liquid-tight and even gas-tight.

From the accompanying specification and drawings, various objects and purposes will be seen for which the invention may be used. It is, however, especially of advantage in the handling and delivery of liquids and gases from one container to another without appreciable loss of the material so handled.

Moreover, as the coupling assembly of the invention may, in its application, be so designed that one coupling member will make a tight joint only with the other in specific combination therewith, its use provides a ready means for ensuring that fluid shall be passed through the system only by persons having custody of the particular coupling member that matches or mates with the one previously made an integral part of the system.

Advantages of the invention will be seen to include many adaptations, particularly where it is desirable or necessary to check or meter the substance, liquid or gas passing through the system in which the coupling members are provided.

Figure 4:
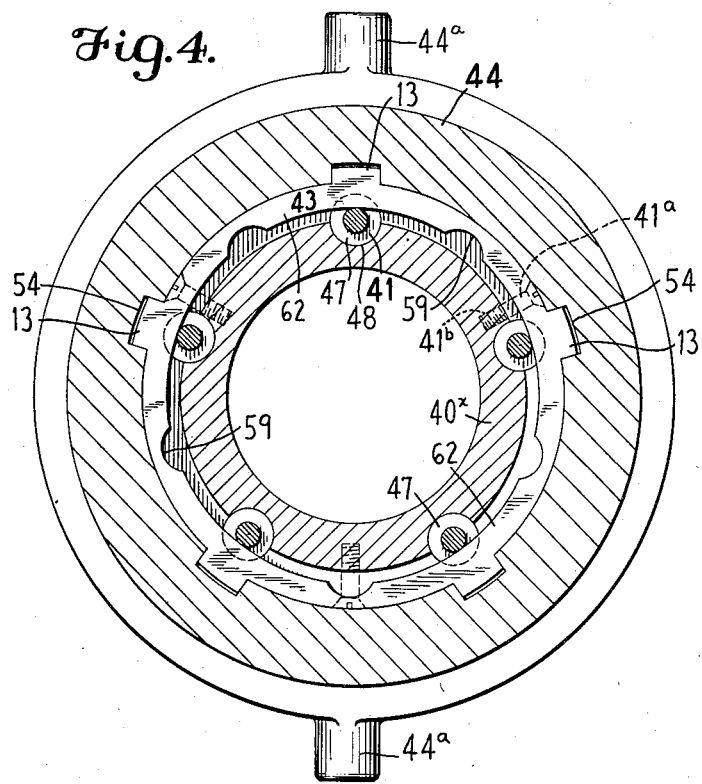
Figure 5:
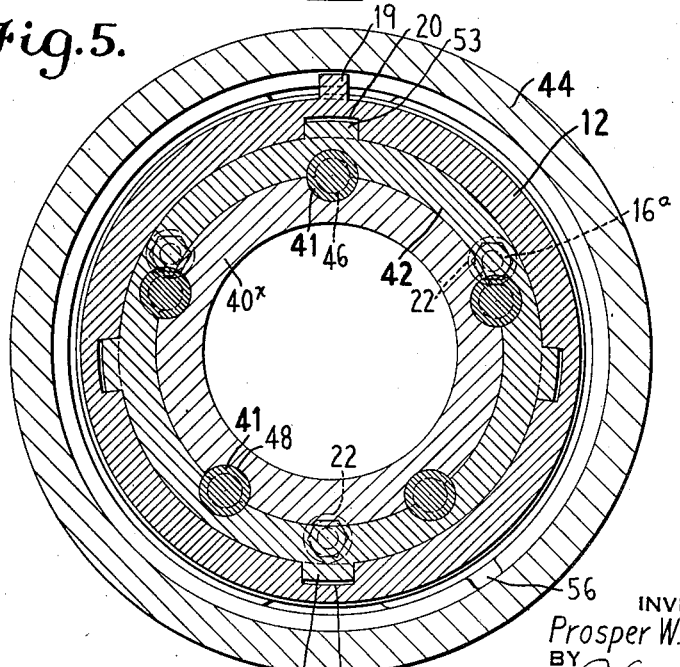

The invention can best be described in connection with the accompanying drawings, which show one way in which the purposes of the invention can be accomplished. In the drawings, Fig. 1 is a longitudinal vertical section of the two parts of the device in locked position; Fig. 2 is a fragmentary section similar to Fig. 1 with the separate coupling members in the first position preparatory to locking; Fig. 3 is a similar section showing the second position just prior to the final locking movement; Fig. 4 is a section taken along line 4—4 of Fig. 1; and Fig. 5 is a section taken along line 5—5 of Fig. 1.

In general, as can be seen from an inspection of Figs. 1, 2 and 3, the coupling assembly is constructed of two members A and B, member A, which I shall call the fixed member, consisting of elements 10, 11 and 12, and member B, which I shall call the movable member of the assembly, consisting of elements 40—45. The movable member B is positioned so that outer sleeve 44 thereof may be placed over ring piece 11 of the fixed member A so that the former may be turned about the latter and locked in place.

The fixed member is constructed of a flanged element 10 of suitable non-corrosive metal as stainless steel, to which is secured an outer ring 11 provided with helical ridges or threads 14 adapted and arranged so that when member 44 is turned thereon an amount preferably less than one turn, the same will act to draw member 44 and its accompanying structure (member B) toward member A.

Member 10 is provided with a flange 15 through which are drilled openings for the reception of machine bolts 16 threaded into ring 11 at suitable points as at 17. The tips of bolts 16 may be exposed as through openings 17a formed in ring 11 so that they may be threaded with a wire sealing member 17b as a precaution against tampering. Resilient washers 18 are carried by bolts 16 so that a key plate 12 may be secured in the position shown in Figs. 1, 2, 3 and 5. The resiliency of the washers allows for wear in packing 57, which will later be described.

Key plate 12, which is shown in side and end section in Figs. 1 and 5, is annular in form and is preferably made of stainless steel. It is provided with a guide pin 19 for the purpose hereinafter to be described and is provided with longitudinal channels 20 on the internal surface thereof. It has a depending flange 21 through which are drilled, at predetermined intervals, holes 22 for the reception of the heads 16a of bolts 16 which hold it resiliently in position.

Flange 21 is provided with lugs 23 which vary in length and position but which are preferably uniform in diameter. These lugs are designed, as will hereinafter more particularly be described, to coact with the ends 46 of push cams 41 in order to bring the circumferential channels 47 of said cams into alignment with a locking ring 43 so that this ring and the outer sleeve 44 of coupling member B may be turned and screwed securely in place on ring 11.

The movable member B consists of a combination of parts mounted on hose section 40 which is preferably made of stainless steel and has corrugations 40a on the inside of the open end for the purpose of gripping a flexible hose 40b when an internal ring 40c is expanded thereagainst in a manner well known in the art.

Referring to Figs. 1 and 4, the parts of movable member B in general are constructed as follows: Hose section 40 is provided with cylindrical openings 48 disposed in and about the annular body 40x thereof, in which openings push cams 41 are longitudinally movable. A cover sleeve 42 fits over the annular body 40x and over the push cams 41 and is secured to 40x by screws 41a extending into threaded openings 41b spaced at suitable intervals as indicated in Fig. 4. The other end of hose section 40 has fixed thereto, as by screws 49, a ring 45. Screws 49 are shown provided with holes 60, through which sealing wires 61 may be threaded, so that the construction cannot be tampered with without breaking these wires or the seal thereof.

Adjacent the ring 45 is an outer sleeve 44 adapted to turn about the members 40, 41 and 42 when the circumferential channels 47 of push cams 41 are brought into alignment with locking ring 43, shown in Figs. 2 and 3 in its "open" position. When the channels are in this position the intermediate portions 62 (Figs. 1 and 4) of locking ring 43 are permitted to pass through channels 47 so that the ring, with its related parts, may be turned.

Locking ring 43 is preferably made of manganese bronze, and is provided with cut-outs 59 of a slightly greater diameter than that of push cams 41.

Push cams 41 are held outwardly by springs 50. Cover sleeve 42, preferably made of stainless steel, is provided with a ring or flange 51 to take the stress put upon it by shoulder 52 of outer sleeve 44 where the same is taken up against ring 11. Sleeve 42 also has a number of irregularly spaced projections or lugs 53 which slide in channels 20 of key plate 12 as the two parts are put together. The inner periphery of the sleeve is grooved, as shown best in Fig. 5, for the reception of push cams 41, which are held between sleeve 42 and the annular body 40×.

Outer sleeve 44 is provided with grooves 54 in which lugs 13 of locking ring 43 slide during the take-up operation. At its outer periphery it carries lugs 44ᵃ to facilitate turning as by a spanner wrench, and on its furthermost end carries internal threads 55 corresponding in location with threads 14 on member 11. An appropriate groove or slot 56 (Figs. 2 and 3) is cut in the end of outer sleeve 44 so that pin 19 of key plate 12 may pass through it as the sections are mated.

A suitable packing 57 is provided in the end of 40× in order that the joint between the two sections of the coupling may be kept fluid-tight when the same are in mated position.

When the coupling is put together, movable member B is brought up to fixed member A by moving the former longitudinally with relation to the latter while guide pin 19 passes through slot 56. During this manipulation, lugs 53 of cover sleeve 42 slide through grooves 20 until the assembly reaches the position shown in Fig. 2. At this point, lugs 23 are flush with the ends 46 of cams 41 but have not yet pushed the cams back. These lugs, as previously indicated, are of irregular length or spacing or of different length and spacing, so that for any particular assembly they serve as the key of a lock, and so that only predetermined members can be brought into fluid-tight relationship with each other.

Further movement of the coupling members toward each other causes lugs 23 to push back cams 41 against springs 50 a distance determined in each case so that the annular grooves or channels 47 are brought into alignment with locking ring 43. The position of the parts at this stage is shown in Fig. 3. At this point the outer sleeve 44 may be turned and tightened on threads 14, 55, so that shoulder 52 comes up against flange 51, sleeve 42 abuts the depending annulus 21 of key plate 12, and the parts 40× and 15 are drawn firmly together against resilient gasket 57 as shown in Fig. 1. The result is a fluid-tight joint.

What I claim is:

1. In a fluid system, a mated coupling comprising a fixed member and a movable member adapted to fit over and against the fixed member, a plurality of longitudinally extending lugs disposed on said fixed member, a complementary member of longitudinally yielding cams having annular grooves thereon disposed on said movable member, and a locking ring disposed within said movable member, said ring being adapted and arranged to be brought into alignment wtih the annular grooves when the movable member is moved toward the fixed member to depress said cams, and to turn through said grooves when the movable member is rotated.

2. In a fluid system, a mated coupling comprising a fixed member and a movable member adapted to fit over and against the fixed member, a plurality of longitudinally extending lugs of variable length disposed on said fixed member, an equal number of longitudinally yielding cams having annular grooves thereon disposed on said movable member, and a locking ring disposed within said movable member, said cams being so proportioned and related to said lugs that the said ring is brought into alignment with the annular grooves when the members are moved a predetermined distance toward one another to depress said cams, and so that said ring may then be rotated through said grooves.

3. In a fluid system, a mated coupling comprising a fixed member and a movable member adapted to fit over and against the fixed member, a plurality of longitudinally extending lugs disposed on said fixed member, an equal number of longitudinally movable cams yieldingly disposed on said movable member, said cams having annular grooves therein, and a locking ring mounted in said movable member and rotatable therewith, said lugs, cams, grooves and ring being so related that the ring may be turned through said grooves when the movable member is brought into predetermined relationship with said fixed member.

4. In a fluid system, a mated coupling comprising a fixed member and a movable member, a plurality of notched rods and a locking ring disposed within said movable member, and means on said fixed member for moving said notched rods into alignment with said ring whereby the said ring may be turned through said notches.

5. In a fluid system, a mated coupling comprising a fixed member and a movable member, a plurality of notched rods and a locking ring disposed within said movable member, means on said fixed member for moving said notched rods into alignment with said ring whereby the said ring may be turned through said notches, and means on said members for permitting them to be mated in fluid-tight relationship only when said notched rods are aligned with said ring and the members thereafter rotated with respect to each other.

6. In a fluid system, a mated coupling comprising a fixed member and a movable member, a plurality of notched rods, a plurality of keys and a ring disposed within and carried by said movable member, and complementary rod-engaging lugs and key-engaging key-ways carried by said fixed member, said complementary members being adapted to coact and interfit when the respective members are brought together so that one may be turned about the other to bring the same in fluid-tight relationship with each other.

PROSPER W. PARKERTON.